United States Patent Office 2,857,349
Patented Oct. 21, 1958

2,857,349

POLYVINYL RESIN COMPOSITIONS PLASTICIZED WITH PARTIALLY EPOXIDIZED FATTY ACID ESTERS

Frank P. Greenspan and Ralph J. Gall, Buffalo, N. Y., assignors, by mesne assignments, to Food Machinery and Chemical Corporation, San Jose, Calif., a corporation of Delaware No Drawing. Application October 29, 1954
Serial No. 465,716

7 Claims. (Cl. 260—23)

This invention pertains to plasticized polyvinyl resin compositions and more particularly to such resin compositions plasticized with partially epoxidized fatty acid esters.

It is well known that polyvinyl resins, to be useful for many purposes, have to be plasticized to make the resin flexible and soft enough to permit milling for the purpose of producing resin sheets or films. Plasticizers used for this purpose must meet certain requirements, most of all the requirement of being compatible with the resin to be plasticized. Moreover, the plasticizers must impart to the milled sheet certain properties which are necessary to make such plasticized milled sheets or films useful. The plasticized resin sheet must be able to undergo a certain amount of elongation, must show a satisfactory heat stability and must remain flexible at a relatively low temperature.

A relatively small number of plasticizers meeting all these requirements are known and in commercial use. One such plasticizer, characterized by imparting good flexibility and stability to the plasticized resin film, is di-octyl phthalate, which is widely used commercially. Another type of plasticizer, with definite advantages over di-octyl phthalate, is represented by the epoxidized esters of unsaturated fatty acids and such plasticizers are described by Terry and Wheeler in U. S. Patent 2,559,177.

In all previous methods of preparing epoxidized fatty acid esters or epoxidized triglycerides, operations were performed in such a manner as to epoxidize substantially all double bonds present in the material. In other words, previously published epoxidation methods all aimed at producing a fully epoxidized material possessing essentially no ethylenic unsaturation. As a matter of fact, it was thought that substantially complete epoxidation was an absolute necessity if useful plasticizers were to result from the process. This thought was based on the fact that unepoxidized oils possessing original unsaturation are not compatible with plastics which it is desired to plasticize. Therefore, all published methods of making epoxidized higher fatty acid esters, such as epoxidized oils, for plasticizing purposes aimed at complete epoxidation so as to leave only a minimum amount of residual unsaturation in the epoxidized material. These epoxidation processes are well known and well developed and employ, to achieve their aim of substantially complete epoxidation, at least stoichiometric amounts of epoxidizing agent. This agent, in the preferred methods, is an organic peracid and usually peracetic acid. Of this organic peracid, quantities were employed sufficient to epoxidize substantially all double bonds present in the material.

It has now been found, in accordance with the present invention, that higher fatty acid esters which have been partially epoxidized, as described in copending application Serial No. 418,208, Patent No. 2,810,733, filed March 23, 1954, are not only compatible with resins but actually have performance characteristics equal to or better than those of fully epoxidized esters. Although the main advantage of partially epoxidized esters is an economical one, additional advantages can be cited, notably superior low temperature rate flexibility obtained by their use. In the manufacture of these partially epoxidized esters, substantially reduced quantities of epoxidizing agent can be used because obviously partial epoxidation of a given quantity of a given ester requires less reactants than complete epoxidation. Thus, partially epoxidized esters represent a class of plasticizers equal or superior to the highly satisfactory fully epoxidized esters. Yet this high standard of performance is obtained at substantially reduced cost in making such plasticizers. In view of the fact that in plasticizing polyvinyl resins, fairly large amounts of plasticizer are generally used, a lower cost plasticizer results in lower cost plasticized resins and is, therefore, of practical importance to the plastics manufacturer as well as to the consuming public.

It is, therefore, an object of the present invention to provide plasticized polyvinyl resin compositions containing relatively low-cost plasticizers in form of partially epoxidized fatty acid esters.

The invention is applicable to polyvinyl resins in general and particularly applicable to polyvinyl chloride, vinyl chloride-vinylidene chloride co-polymers, vinyl chloride-vinyl acetate co-polymers, polyvinyl butyral and polyvinyl acetate.

The plasticizing agents considered by this invention comprise partially epoxidized esters of unsaturated higher fatty acids. Examples of such plasticizers are partially epoxidized linseed oil, partially epoxidized soybean oil, and monohydric and polyhydric alcohol esters of linoleic and linolenic acids. In view of the composition of the above mentioned oils, the plasticizers of this invention, therefore, broadly comprise partially epoxidized unsaturated fatty acid esters of the unsaturated higher fatty acids with the lower monohydric and polyhydric alcohols.

The plasticizers of this invention may be used by themselves and also, if desired, as partial plasticizers in mixture with other types of plasticizers such as di-octyl phthalate. Stabilizers of the type of metal salts of fatty acids may be used in conjunction with the plasticizers of this invention although they are not a necessity. Because epoxy type plasticizers generally have stabilizing properties, reduced amounts of actual stabilizers are usually satisfactory.

In the following examples, various vinyl polymers were plasticized by a standard milling process and sheeted. In these examples plasticizer performance is given in terms of percent elongation, compatibility, heat stability and minimum flex temperature. These characteristics are generally accepted as important indications of plasticizer performance.

To permit comparison of the performance characteristics of the partially epoxidized plasticizers of this invention with the corresponding, more expensive fully epoxidized plasticizers of the same type, typical performance data for fully epoxidized fatty acid esters are listed here.

In this invention the esters of the following unsaturated fatty acids are considered among others:

Oleic acid
Linoleic acid
Linolenic acid
Hendecenoic acid $C_{18}$ acids
$C_{20}$ acids
$C_{22}$ acids
Palmitoleic acid

EXAMPLE 1

*Polyvinyl chloride plasticized with fully epoxidized soybean oil*

- Plasticizer percentage: 35.
- Percent elongation at 25° C: 340.
- Compatibility: No sweat-out in 6 weeks at room temperature.
- Light stability: Slight bleaching after 500 hours U. V. light exposure.
- Heat stability: No change in 5 min. at 310° F.
- Minimum flex temperature: −16° C.

*Polyvinyl chloride plasticized with fully epoxidized safflower oil*

- Plasticizer percentage: 35.
- Percent elongation at 25° C: 310.
- Compatibility: No sweat-out in 6 weeks at room temperature.
- Light stability: Slight discoloration after 500 hours U. V. light exposure.
- Heat stability: No change in 5 min. at 310° F.
- Minimum flex temperature: −18° C.

The flex temperature as determined in this and the following examples was in accordance with the Clash-Berg method.

The following examples will serve to illustrate the performance of the plasticizers of this invention:

EXAMPLE 2

*Polyvinyl chloride plasticized with partially epoxidized soybean oil (60% epoxidation)*

- Plasticizer percentage: 35.
- Percent elongation at 25° C: 280.
- Compatibility: No sweat-out in 6 weeks at room temperature.
- Light stability: Very slight bleaching after 500 hours U. V. light exposure.
- Heat stability: No change in 5 min. at 310° F.
- Minimum flex temperature: −36° C.

EXAMPLE 3

*Vinyl chloride—vinylidine chloride co-polymer plasticized with partially epoxidized soybean oil (60% epoxidation)*

- Plasticizer percentage: 33.
- Percent elongation at 25° C: 340.
- Compatibility: No sweat-out in 6 weeks at room temperature.
- Light stability: No discoloration after 500 hours U. V. light exposure.
- Heat stability: No change in 5 min. at 310° F.

EXAMPLE 4

*Vinyl chloride—vinyl acetate co-polymer plasticized with partially epoxidized safflower oil (60% epoxidation)*

- Plasticizer percentage: 34.
- Percent elongation at 25° C: 370.
- Compatibility: No sweat-out in 6 weeks at room temperature.
- Light stability: No discoloration after 500 hours U. V. light exposure.
- Heat stability: No change in 5 min. at 310° F.

EXAMPLE 5

*Polyvinyl chloride plasticized with partially epoxidized safflower oil (60% epoxidation)*

- Plasticizer percentage: 35.
- Percent elongation at 25° C: 300.
- Compatibility: No sweat-out in 6 weeks at room temperature.
- Light stability: Slight discoloration after 500 hours U. V. light exposure.
- Heat stability: No change in 5 min. at 310° F.
- Minimum flex temperature: −35° C.

EXAMPLE 6

*Polyvinyl chloride plasticized with partially epoxidized linseed oil and dioctyl phthalate (46% epoxidation)*

- Plasticizer percentage:
  - Partially epoxidized linseed oil: 8%.
  - Dioctyl phthalate: 28%.
- Percent elongation at 25° C: 350.
- Compatibility: No sweat-out in 6 weeks at room temperature.
- Heat stability: No change in 5 min. at 310° F.
- Minimum flex temperature: −37° C.

EXAMPLE 7

*Polyvinyl chloride plasticized with partially epoxidized corn oil (80% epoxidation)*

- Plasticizer percentage: 35.
- Percent elongation at 25° C: 300.
- Compatibility: No sweat-out in 6 weeks at room temperature.
- Light stability: Slight discoloration after 500 hours U. V. light exposure.
- Heat stability: No change in 5 min. at 310° F.
- Minimum flex temperature: −29° C.

EXAMPLE 8

*Polyvinyl chloride plasticized with partially epoxidized butyl ester of tall oil fatty acids (80% epoxidation)*

- Plasticizer percentage: 35.
- Percent elongation at 25° C: 390.
- Compatibility: No sweat-out in 2 weeks.
- Light stability: No discoloration after 500 hours U. V. light exposure.
- Heat stability: No change in 5 min. at 310° F.
- Minimum flex temperature: −62° C.

The term "partially epoxidized higher fatty acid ester," denotes the product resulting from epoxidation of an ester containing both mono-unsaturated higher fatty acid radicals and poly-unsaturated higher fatty acid radicals, such that substantially all the double bonds of the mono-unsaturated radicals has been converted to the epoxide and substantially only one of the multiple double bonds in the poly-unsaturated radicals has been converted to the epoxide. The ester radical may be of a lower aliphatic monohydric alcohol or aliphatic polyhydric alcohol.

The epoxidized fatty esters utilized in this invention are prepared from esters of fatty acids having at least 18 carbon atoms and containing both monoethylenically unsaturated fatty acids and polyethylenically unsaturated fatty acids. The acids contain at least about as great a percentage of monounsaturated acids as is combined in safflower oil and not more monounsaturated acids than is contained in tall oil. The acids further contain at least about as great a percentage of polyunsaturated fatty acids as is combined in corn oil and not more polyunsaturated fatty acids than is combined in safflower oil.

What is claimed is:

1. A plasticized polyvinyl resin composition comprising a polyvinyl resin from the group consisting of polyvinyl butyral, the homopolymers of vinyl chloride and vinyl acetate, and the copolymers of vinyl chloride with vinylidene chloride, and vinyl chloride with vinyl acetate, and an epoxidized ester, said epoxidized ester having been prepared by epoxidation of an ester formed by esterifying (a) a mixture of fatty acids having at least 18 carbon atoms and containing at least about as great a percentage of monoethylenically unsaturated fatty acids as is combined in safflower oil and not more monoethylenically unsaturated fatty acids than is contained in tall oil and at least about as great a percentage of polyethylenically unsaturated fatty acids as is combined in corn oil and not more polyethylenically unsaturated fatty acids than is combined in safflower oil (b) an alcohol from the group consisting of the lower aliphatic monohydric alcohols and the aliphatic polyhydric alcohols, and said epoxidized ester having been epoxidized to the extent required to epoxidize substantially all of the double bonds present in each ethylenically monounsaturated and one only of the double bonds present in each ethylenically polyunsaturated fatty acid residue in said ester, by reaction of said ester under epoxidizing conditions with a peracid employed in an amount of about 1 to 1.3 moles of peracid for each double bond in each mole of esterified ethylenically monounsaturated acid plus 1 to 1.3 moles of peracid for one double bond only of each mole of esterified ethylenically polyunsaturated acid.

2. A plasticized polyvinyl chloride resin composition comprising polyvinyl chloride and an epoxidized ester, said epoxidized ester having been prepared by epoxidation of an ester formed by esterifying (a) a mixture of fatty acids having at least 18 carbon atoms and containing at least about as great a percentage of monoethylenically unsaturated fatty acids as is combined in safflower oil and not more monoethylenically unsaturated fatty acids than is contained in tall oil and at least about as great a percentage of polyethylenically unsaturated fatty acids as is combined in corn oil and not more polyethylenically unsaturated fatty acids than is combined in safflower oil (b) an alcohol from the group consisting of the lower aliphatic monohydric alcohols and the aliphatic polyhydric alcohols, and said epoxidized ester having been epoxidized to the extent required to epoxidize substantially all of the double bonds present in each ethylenically monounsaturated and one only of the double bonds present in each ethylenically polyunsaturated fatty acid residue in said ester, by reaction of said ester under epoxidizing conditions with a peracid employed in an amount of about 1 to 1.3 moles of peracid for each double bond in each mole of esterified ethylenically monounsaturated acid plus 1 to 1.3 moles of peracid for one double bond only of each mole of esterified ethylenically polyunsaturated acid.

3. A plasticized polyvinyl resin composition comprising a polyvinyl resin from the group consisting of polyvinyl butyral, the homopolymers of vinyl chloride and vinyl acetate, and the copolymers of vinyl chloride with vinylidene chloride, and vinyl chloride with vinyl acetate, and an epoxidized soybean oil, said epoxidized soybean oil having been epoxidized to the extent required to epoxidize substantially all of the double bonds present in each ethylenically monounsaturated and one only of the double bonds present in each ethylenically polyunsaturated fatty acid residue in said soybean oil, by reaction of said soybean oil under epoxidizing conditions with a peracid employed in an amount of about 1 to 1.3 moles of peracid for each double bond in each mole of esterified ethylenically monounsaturated acid plus 1 to 1.3 moles of peracid for one double bond only of each mole of esterified ethylenically polyunsaturated acid.

4. A plasticized polyvinyl chloride resin composition comprising polyvinyl chloride and an epoxidized soybean oil, said epoxidized soybean oil having been epoxidized to the extent required to epoxidize substantially all of the double bonds present in each ethylenically monounsaturated and one only of the double bonds present in each ethylenically polyunsaturated fatty acid residue in said soybean oil, by reaction of said soybean oil under epoxidizing conditions with a peracid employed in an amount of about 1 to 1.3 moles of peracid for each double bond in each mole of esterified ethylenically monounsaturated acid plus 1 to 1.3 moles of peracid for one double bond only of each mole of esterified ethylenically polyunsaturated acid.

5. A plasticized polyvinyl resin composition comprising a polyvinyl resin from the group consisting of polyvinyl butyral, the homopolymers of vinyl chloride and vinyl acetate, and the copolymers of vinyl chloride with vinylidene chloride, and vinyl chloride with vinyl acetate, and an epoxidized safflower oil, said epoxidized safflower oil having been epoxidized to the extent required to epoxidize substantially all of the double bonds present in each ethylenically monounsaturated and one only of the double bonds present in each ethylenically polyunsaturated fatty acid residue in said safflower oil, by reaction of said safflower oil under epoxidizing conditions with a peracid employed in an amount of about 1 to 1.3 moles of peracid for each double bond in each mole of esterified ethylenically monounsaturated acid plus 1 to 1.3 moles of peracid for one double bond only of each mole of esterified ethylenically polyunsaturated acid.

6. A plasticized polyvinyl resin composition comprising a polyvinyl resin from the group consisting of polyvinyl butyral, the homopolymers of vinyl chloride and vinyl acetate, and the copolymers of vinyl chloride with vinylidene chloride, and vinyl chloride with vinyl acetate, and an epoxidized linseed oil, said epoxidized linseed oil having been epoxidized to the extent required to epoxidize substantially all of the double bonds present in each ethylenically monounsaturated and one only of the double bonds present in each ethylenically polyunsaturated fatty acid residue in said linseed oil, by reaction of said linseed oil under epoxidizing conditions with a peracid employed in an amount of about 1 to 1.3 moles of peracid for each double bond in each mole of esterified ethylenically monounsaturated acid plus 1 to 1.3 moles of peracid for one double bond only of each mole of esterified ethylenically polyunsaturated acid.

7. A plasticized polyvinyl resin composition comprising a polyvinyl resin from the group consisting of polyvinyl butyral, the homopolymers of vinyl chloride and vinyl acetate, and the copolymers of vinyl chloride with vinylidene chloride, and vinyl chloride with vinyl acetate, and an epoxidized corn oil, said epoxidized corn oil having been epoxidized to the extent required to epoxidize substantially all of the double bonds present in each ethylenically monounsaturated and one only of the double bonds present in each ethylenically polyunsaturated fatty acid residue in said corn oil, by reaction of said corn oil under epoxidizing conditions with a peracid employed in an amount of about 1 to 1.3 moles of peracid for each double bond in each mole of esterified ethylenically monounsaturated acid plus 1 to 1.3 moles of peracid for one double bond only of each mole of esterified ethylenically polyunsaturated acid.

References Cited in the file of this patent

UNITED STATES PATENTS

| | | |
|---|---|---|
| 2,458,484 | Terry et al. | Jan. 4, 1949 |
| 2,485,160 | Niederhauser et al. | Oct. 18, 1949 |
| 2,556,145 | Niederhauser | June 5, 1951 |
| 2,559,177 | Terry et al. | July 3, 1951 |
| 2,569,502 | Swern et al. | Oct. 2, 1951 |

OTHER REFERENCES

Findley et al.: J. Amer. Chem. Soc., 67:412 (1945).
Greenspan et al.: Ind. and Eng. Chem., December 1953, pages 2722–26.